United States Patent [19]

Thiessen

[11] 4,274,556

[45] Jun. 23, 1981

[54] DUAL DISPENSING CONTAINER

[76] Inventor: Eldon D. Thiessen, 888 Southwest River Dr., Dallas, Oreg. 97338

[21] Appl. No.: 19,518

[22] Filed: Mar. 12, 1979

[51] Int. Cl.³ .......................... B65D 1/00; B65D 25/38
[52] U.S. Cl. .................................... 222/135; 137/539; 220/22; 220/94 A; 222/207; 222/323
[58] Field of Search ............... 222/129, 135, 207–213, 222/215, 323, 324, 465, 530; 220/20, 22, 94 A; 137/DIG. 2, 539; 251/82

[56] References Cited

U.S. PATENT DOCUMENTS

| 502,590 | 8/1893 | Sill | 222/207 X |
|---|---|---|---|
| 1,275,783 | 8/1918 | Steinmetz | 137/DIG. 2 |
| 1,754,078 | 4/1930 | Borzi | 222/135 |
| 2,611,045 | 9/1952 | Wayman | 137/539 X |
| 3,154,219 | 10/1965 | Dean et al. | 222/129 |
| 3,319,830 | 5/1967 | Ward | 222/129.4 X |
| 3,877,614 | 4/1975 | Murphy | 222/211 X |
| 4,125,207 | 11/1978 | Ernst et al. | 220/94 A X |

FOREIGN PATENT DOCUMENTS

378341 12/1921 Fed. Rep. of Germany ........... 222/129

*Primary Examiner*—F. J. Bartuska
*Attorney, Agent, or Firm*—Oliver D. Olson

[57] ABSTRACT

A one-piece housing defines a pair of laterally separated chambers for containing liquids to be dispensed. A pair of hollow filler necks extend upwardly from the top wall of the housing for communication each with a different one of the chambers for filling the latter with a liquid, and a carrying handle is secured to and extends laterally between said necks. A squeeze bulb type pump associated with each chamber has an intake pipe extending into the chamber and is removably closed by a ball check valve. A flexible outlet dispenser tube extends from the valve body and is fitted at its outer end with a check valve for allowing flow of liquid only in the outfeed direction. The ball check is moved from the closed position by partial vacuum created by expansion of the bulb following squeezing, and the ball check is closed during collapsing of the bulb as it is squeezed. A threaded plunger on the ball check valve body also is movable into abutment with the ball to secure the latter in closed position during transport and storage of the container. The squeeze bulbs are confined in depressions formed in the top wall of the container housing.

4 Claims, 5 Drawing Figures

DUAL DISPENSING CONTAINER

BACKGROUND OF THE INVENTION

This invention relates to containers for dispensing liquids, and more particularly to a one piece dual container for the storing and selective dispensing of two different liquids.

There are many activities and industrial applications which require the separate but coordinated dispensing of different liquids. For example, in the operation of a chain saw it is required that lubricating oil be dispensed periodically to the chain and that the small gasoline tank be refilled from time to time. Heretofore, these requirements have imposed upon the user the difficult task of carrying two separate containers, one for gasoline and the other for oil, while still carrying the chain saw to and from the site of sawing.

U.S. Pat. No. 1,754,078 discloses an oil can in which two separate chambers are disposed vertically, one above the other, with both chambers having a common outlet. Each chamber is provided with a manually operable piston-type pump, and the pump for the lower chamber extends upward through the upper chamber. This arrangement presents the possibility of leakage of liquid from the upper chamber to the lower one and the consequent mixing of the oil in the upper chamber with the oil in the lower chamber.

SUMMARY OF THE INVENTION

In its basic concept, this invention provides a one-piece housing which defines a pair of laterally separated chambers each having its own removable dispenser pump mounted independently of the other chamber.

It is by virtue of the foregoing basic concept that the primary objective of this invention is achieved; namely to overcome the aforementioned disadvantages and limitations of the prior dual dispensing containers.

Another object of this invention is the provision of a dual dispensing container of the class described which includes an elongated flexible dispenser hose extending from each pump outlet and fitted at its outer end with a check valve which allows fluid flow only in the outfeed direction.

Still another objective of this invention is the provision of a dual dispensing container of the class described which includes friction retainer means on the top of the one-piece housing for storing flexible dispenser hoses when not in use.

A further object of this invention is the provision of a dual dispensing container of the class described which includes a pair of laterally separated filler necks communicating with the separate chambers in the one-piece housing and serving the dual purpose of filling the chambers with different liquids and of supporting a carrying handle extending between the necks.

A still further object of this invention is the provision of a dual dispensing container of the class described which is of simplified construction for economical manufacture.

The foregoing and other objects and advantages of this invention will appear from the following detailed description, taken in connection with the accompanying drawing of a preferred embodiment.

DESCRIPTION OF THE PREFERRED EMBODIMENT

Figure 1:
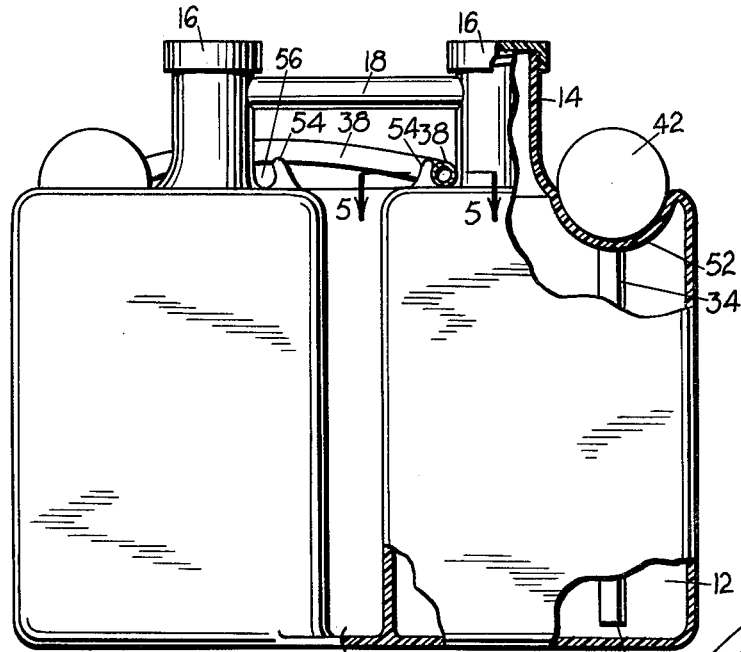
FIG. 1 is a side elevation of a dual dispensing container embodying the features of this invention, parts being broken away to disclose structural details.

The dual dispensing container of this invention includes a one-piece housing which defines a plurality of laterally separated chambers each of which extends the full vertical height of the housing between the top and bottom walls thereof. In the embodiment illustrated, the housing defines a pair of such laterally separated chambers 10 and 12. For purposes of economy, the housing is made of a synthetic thermoplastic resin and is formed by conventional molding techniques. It is to be understood, of course, that the housing may be made of metal, if desired.

Liquid is filled into each chamber through a filler inlet provided in the form of an upstanding filler neck 14. The upper end portion of each neck is provided with an exterior thread for the removable reception of a cap 16 which serves to close the filler neck, as will be understood.

In the preferred embodiment illustrated, the pair of upstanding filler necks serve the additional function of anchoring the opposite ends of a handle 18 by which the dual dispensing container is carried.

Each chamber is provided with its own liquid dispensing pump. Further, each pump is removable from its associated chamber and is mounted independently of any other chamber so as to preclude any possibility of the pumps contributing to leakage of liquids between adjacent containers.

Although plunger and other type pumps may be employed, in the preferred embodiment illustrated, each pump is of the squeeze bulb type. It includes a valve body 20 (FIG. 3) provided with a hollow liquid inlet coupling 22, a hollow liquid outlet coupling 24, a hollow squeeze bulb coupling 26 and a hollow valve locking plunger coupling 28.

The hollow liquid inlet coupling is provided with an external thread for the removable attachment of the valve body to the top wall 30 of the housing. For this purpose a boss 32 is formed in the top wall of the housing in communication with each chamber and is provided with a threaded bore for the removable reception of the external thread on the inlet coupling of the valve body.

Attached to the liquid inlet coupling of the valve body is an elongated inlet pipe 34 which extends downward into the associated chamber and terminates adjacent the bottom thereof. The liquid inlet coupling also is provided with a ball check 36 which normally closes its associated seat. This normal closing of the seat is achieved either by gravity along, or by spring loading as explained hereinafter.

The fluid outlet coupling 24 of the valve mounts the inner end of an elongated flexible dispenser tube 38.

Associated with the oulet coupling or, preferably, the outlet dispenser tube adjacent the outer end thereof, is a check valve 40 arranged to allow fluid flow only in the outfeed direction.

The hollow squeeze bulb coupling 26 of the valve mounts the open end of a flexible squeeze bulb 42. This bulb functions to draw liquid from the chamber and to dispense it through the dispenser tube 38, as follows: As the bulb is collapsed by squeezing, the ball check 36 is closed on its seat and therefore air is expelled from the bulb through the dispenser tube, by opening of the check valve 40. When hand pressure is withdrawn from the collapsed squeeze bulb, expansion of the latter causes the check valve 40 at the outer end of the outfeed dispensing tube to close and the ball check 36 to be lifted from its seat in the liquid inlet coupling. Liquid in the associated chamber thus is drawn into the expanding squeeze bulb until the pressures within the squeeze bulb and the chamber are equalized. The ball check then closes on its seat. When the bulb is collapsed once again by squeezing, the liquid contained within it is forced out through the outfeed dispenser tube.

By positioning the check valve 40 adjacent the outer end of the outfeed dispenser tube, the dripping of liquid from the tube is minimized, as will be understood.

Means is provided for securing the ball check 36 in closed position during storage and transport of the dual dispensing container, whereby to insure against leakage of liquid from the chambers. In the embodiment illustrated, a locking plunger 44 extends freely downward through the hollow plunger coupling 28 of the valve body. The outer end of the plunger is secured to a cap 46 provided with an internal thread matching the external threads of the coupling. One or more O-ring seals 48 are interposed between the plunger and coupling to prevent outward leakage of liquid, as will be understood.

By rotation of the cap 46, the plunger 44 is moved toward and away from the ball check 36. It is movable into positive abutment with the ball check, whereby to secure it against its seat and thus prevent the passage of liquid from the chamber into the valve body. By rotating the cap in the opposite direction, the plunger is moved away from the ball check, as will be understood.

Figure 3:
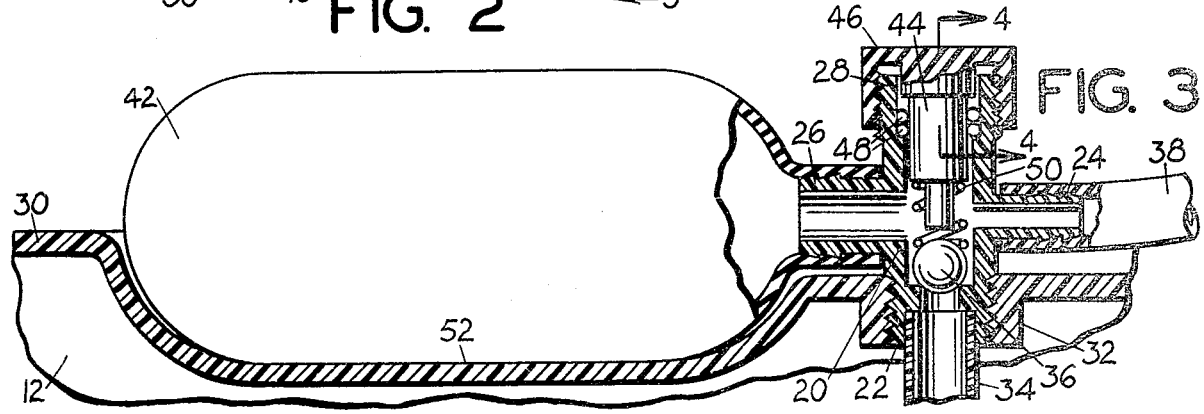
FIG. 3 is a fragmentary sectional view taken on the line 3—3 in FIG. 2.

As previously mentioned, the ball check may be retained in the normally closed position illustrated in FIG. 3 by gravity alone, or with the assistance of spring pressure. For this latter purpose, a coil spring 50 may encircle the inner, reduced diameter portion of the plunger, bearing at one end against the shoulder defined between the different diameter segments of the plunger and at the opposite end against the ball 36.

In the embodiment illustrated, each of the squeeze bulbs 42 is retained in convenient operative position by reception of its lower portion in a depressed cavity 52 formed in the top wall 30 of the housing. The cavity is deep enough to retain the squeeze bulb against lateral displacement, while allowing sufficient exposure of the top portion of the bulb for convenient access to the hand for squeezing.

Figure 5:
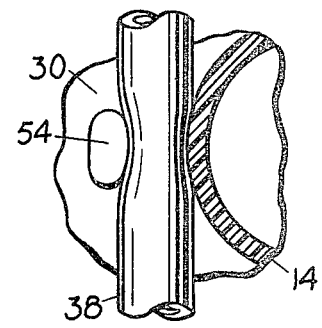
FIG. 5 is a fragmentary sectional view taken on the line 5—5 in FIG. 1.

Means also is provided for retaining the elongated flexible outfeed dispenser tubes 38 in stored position within the plan profile of the container, when not in use. In the embodiment illustrated, a projection 54 extends upwardly from the top wall of the housing adjacent the inner side of each of the filler necks 14, to form with the latter a retainer notch 56 for frictionally retaining an intermediate portion of the dispenser tube. As illustrated, the upper end of the projection is spaced from the associated filler neck a distance slightly less than the diameter of the dispenser tube. The latter thus is squeezed slightly (FIG. 5) when it is installed in the storage position, to insure sufficient frictional engagement to prevent its inadvertent release.

Figure 2:
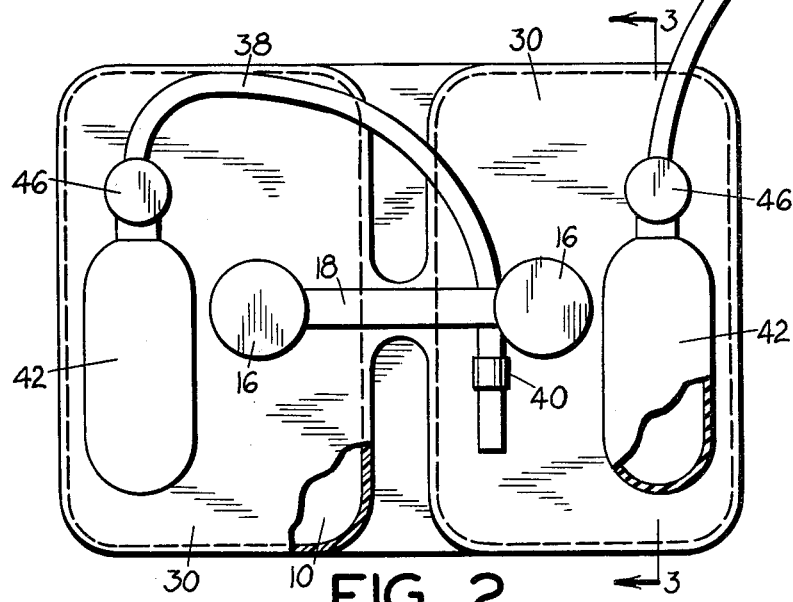
FIG. 2 is a plan view as viewed from the top in FIG. 1, parts being broken away to disclose structural details.
Figure 4:
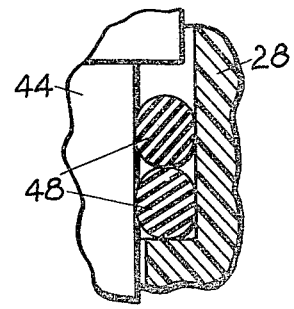
FIG. 4 is a fragmentary sectional view taken on the line 4—4 in FIG. 3.

In FIG. 2 the elongated dispenser tube associated with the right hand pump is shown extended from the container for dispensing of liquid from the right hand chamber 12. The elongated dispenser tube associated with the left hand pump is shown in a storage position secured frictionally by the projection 54 associated with the right hand filler neck.

The dual dispensing container described hereinbefore serves effectively for the storage and dispensing of different liquids. For example, for use with a chain saw, one of the chambers may be filled with gasoline for the engine and the other with lubricating oil for the chain. The container may be transported by one hand gripping the carrying handle 18 extending between the filler necks, leaving the other hand free for carrying the chain saw. During such transport or during storage, engagement of the locking plunger 44 with the ball check 36 insures against spillage of liquid from the chambers, even if the container is tipped over on its side.

It will be apparent to those skilled in the art that various changes may be made in the size, shape, type, number and arrangement of parts described hereinbefore, without departing from the spirit of this invention.

Having now described my invention and the manner in which it may be used, I claim:

1. A dual dispensing container, comprising:
  (a) a one-piece housing defining a pair of laterally separated chambers for containing liquids, the housing having a top wall,
  (b) a pair of hollow filler necks extending upwardly from the top wall of the housing and communicating one with each chamber,
  (c) a carrying handle secured to and extending between the filler necks,
  (d) a dispenser pump for each chamber, each pump including a hollow body secured to the top wall of the housing, an infeed tube extending from the body into the chamber, and an elongated flexible outfeed dispenser tube extending from the body outwardly thereof, and
  (e) a projection extending upwardly from the top wall of the housing adjacent each filler neck and forming therewith a retainer notch for frictionally retaining an intermediate portion of one of the dispenser tubes.

2. A dual dispensing container, comprising:
  (a) a one-piece housing defining a pair of laterally separated chambers for containing liquids, the housing having a top wall,
  (b) a dispenser pump for each chamber, each pump including
    (1) a hollow body secured to the top wall of the housing,
    (2) an infeed tube extending from the body into the chamber,
    (3) an elongated, flexible outfeed dispenser tube extending from the body outwardly thereof,
    (4) a squeeze bulb secured to and communicating with the interior of the hollow body,
    (5) a first check valve in the hollow body arranged to normally close the adjacent end of the infeed tube and to open said adjacent end of the infeed tube upon expansion of the squeeze bulb following squeezing of the bulb to enable drawing liquid from the chamber into the squeeze bulb, and
  (6) a second check valve in the dispenser tube arranged to allow fluid flow only in the outfeed direction, whereby to enable the squeeze bulb to open the first check valve and draw liquid into the bulb,
(c) a pair of hollow filler necks extending upwardly from the top wall of the housing and communicating one with each chamber, and a carrying handle secured to and extending between the filler necks, and
(d) a projection extending upwardly from the top wall of the housing adjacent each filler neck and forming therewith a retainer notch for frictionally retaining an intermediate portion of one of the dispenser tubes.

3. A dual dispensing container, comprising:
(a) a one-piece housing defining a pair of laterally separated chambers for containing liquids, the housing having a top wall, and
(b) a dispenser pump for each chamber, each pump including
  (1) a hollow body secured to the top wall of the housing,
  (2) an infeed tube extending from the body into the chamber,
  (3) an outfeed dispenser tube extending from the body outwardly thereof,
  (4) a squeeze bulb secured to and communicating with the interior of the hollow body,
  (5) a first check valve in the hollow body arranged to normally close the adjacent end of the infeed tube and to open said adjacent end of the infeed tube upon expansion of the squeeze bulb following squeezing of the bulb to enable drawing liquid from the chamber into the squeeze bulb,
  (6) a second check valve in the dispenser tube arranged to allow fluid flow only in the outfeed direction, whereby to enable the squeeze bulb to open the first check valve and draw liquid into the bulb,
  (7) a threaded hollow projection on the body opposite the first check valve, and
  (8) an imperforate valve locking plunger in the hollow projection having a threaded portion engaging the threaded projection for rotation relative thereto, for movement of the plunger into and out of engagement with the first check valve for releasably locking the latter in said normally closed position.

4. For use with a dispensing container, a dispenser pump comprising:
(a) a hollow body arranged for attachment to a container,
(b) an infeed tube extending from the body,
(c) an outfeed dispenser tube extending from the body,
(d) a squeeze bulb secured to and communicating with the interior of the body,
(e) a first check valve in the hollow body arranged to normally close the adjacent end of the infeed tube and to open said adjacent end of the infeed tube upon expansion of the squeeze bulb following squeezing of the bulb, to enable drawing liquid from a container into the squeeze bulb,
(f) a second check valve in the dispenser tube arranged to allow flow only in the outfeed direction, whereby to enable the squeeze bulb to open the first check valve and draw liquid into the bulb,
(g) a threaded hollow projection on the body opposite the first check valve, and
(h) an imperforate valve locking plunger in the hollow projection having a threaded portion engaging the threaded projection for rotation relative thereto, for movement of the plunger into and out of engagement with the first check valve for releasably locking the latter in said normally closed position.

* * * * *